United States Patent
Jung et al.

(10) Patent No.: US 7,151,487 B2
(45) Date of Patent: Dec. 19, 2006

(54) METHOD FOR MEASURING GPS AIR SENSITIVITY AND MOBILE TERMINAL HAVING FUNCTION OF MEASURING GPS AIR SENSITIVITY

(75) Inventors: Kun-Pil Jung, Ichon-shi (KR); Hun-Il Lim, Ichon-shi (KR); In-Sub Lee, Ichon-shi (KR)

(73) Assignee: Curitel Communications, Inc. (KR)

( * ) Notice: Subject to any disclaimer, the term of this patent is extended or adjusted under 35 U.S.C. 154(b) by 0 days.

(21) Appl. No.: 10/899,638

(22) Filed: Jul. 26, 2004

(65) Prior Publication Data

US 2005/0040986 A1    Feb. 24, 2005

Related U.S. Application Data

(63) Continuation of application No. 10/749,598, filed on Dec. 30, 2003, now Pat. No. 6,784,829.

(30) Foreign Application Priority Data

Aug. 21, 2003 (KR) .............................. 2003-57848

(51) Int. Cl.
   *H04B 7/185* (2006.01)
   *G01S 5/02* (2006.01)

(52) U.S. Cl. ................................. 342/357.06

(58) Field of Classification Search ........... 342/357.02, 342/357.06, 357.13; 701/207, 213, 214
   See application file for complete search history.

(56) References Cited

U.S. PATENT DOCUMENTS

| | | | |
|---|---|---|---|
| 5,142,695 A | | 8/1992 | Roberts |
| 5,347,285 A | | 9/1994 | MacDoran et al. |
| 5,451,839 A | | 9/1995 | Keitz et al. |
| 5,745,054 A | * | 4/1998 | Wilkens .................. 340/972 |
| 6,204,808 B1 | | 3/2001 | Bloebaum |
| 6,405,107 B1 | * | 6/2002 | Derman ........................ 701/3 |
| 6,430,996 B1 | * | 8/2002 | Anderson et al. ......... 73/170.26 |
| 6,433,739 B1 | | 8/2002 | Soliman |
| 6,498,927 B1 | * | 12/2002 | Kang et al. .............. 455/245.2 |
| 6,680,914 B1 | * | 1/2004 | Jung et al. .................. 370/252 |

(Continued)

FOREIGN PATENT DOCUMENTS

JP   10-221389   8/1999

OTHER PUBLICATIONS

"The WM 102 P code channel beats a full house of squared channels", Stansell, Mar. 20, 1990, pp. 557-566, 1990 IEEE.

*Primary Examiner*—Dao Phan
(74) *Attorney, Agent, or Firm*—Blakely Sokoloff Taylor & Zafman

(57) ABSTRACT

A method for measuring an air sensitivity of a global positioning system (GPS) signal in a mobile terminal. A GPS signal value is obtained in the mobile terminal. The air sensitivity of the GPS signal value based on a reference GPS signal value is stored in a memory of the mobile terminal, and the air sensitivity of the GPS signal using the analyzed result is displayed on the display unit. A mobile terminal including a controller for obtaining a global positioning system (GPS) signal value is also provided. The terminal also includes a display unit for displaying an air sensitivity of the GPS by using the GPS signal value, and a memory for storing a reference GPS signal value. The controller analyzes the GPS signal value based on the reference GPS signal value, and the display unit displays the air sensitivity of the GPS using the analyzed result.

10 Claims, 5 Drawing Sheets

U.S. PATENT DOCUMENTS

| | | | |
|---|---|---|---|
| 6,732,022 B1 * | 5/2004 | Mardirossian | 701/3 |
| 6,744,396 B1 * | 6/2004 | Stone et al. | 342/36 |
| 6,894,610 B1 * | 5/2005 | Schubert et al. | 340/531 |
| 2003/0027537 A1 * | 2/2003 | Kimura | 455/232.1 |
| 2003/0132343 A1 * | 7/2003 | Kurose | 244/97 |
| 2003/0132860 A1 * | 7/2003 | Feyereisen et al. | 340/973 |
| 2004/0068372 A1 * | 4/2004 | Ybarra et al. | 701/301 |
| 2005/0125141 A1 * | 6/2005 | Bye | 701/200 |

* cited by examiner

METHOD FOR MEASURING GPS AIR SENSITIVITY AND MOBILE TERMINAL HAVING FUNCTION OF MEASURING GPS AIR SENSITIVITY

The present patent application is a Continuation of application Ser. No. 10/749,598, filed Dec. 30, 2003 now U.S. Pat. No. 6,784,829.

FIELD OF THE INVENTION

The present invention relates to a mobile terminal having a function of measuring air sensitivity of global positioning system GPS and displaying the measured air sensitivity of GPS on a display unit in a mobile terminal.

DESCRIPTION OF RELATED ARTS

FIG. 1 is a flow chart showing a conventional method for measuring air sensitivity of global positioning system GPS. In the conventional method, a user carries a mobile terminal having global positioning system GPS and enters a street or a field for a field test to measure air sensitivity of GPS in the mobile terminal at step S101. The user starts to perform functions of GPS in the mobile terminal at step S102. The user determines whether or not the functions of the GPS in the mobile terminal is well-performed by using additional equipment such as a diagnostic monitoring device and if the functions of the GPS is well-performed, the user stops to measure the air sensitivity of the GPS at step S103. If the functions of the GPS are not well-performed, the user performs a debugging procedure at step S104 and restart to whole procedure for measuring the air sensitivity of the GPS in the mobile terminal from the step S101.

The conventional method for measuring the air sensitivity of the GPS may have an advantage such that the user can measure air sensitivity of the GPS by himself. However, it also has drawbacks. At first, there is no numerical reference for measuring the air sensitivity of GPS. Therefore, the air sensitivity of GPS cannot be accurately reported to users. According to the conventional method, the air sensitivity of GPS is analyzed by user's experience of using the GPS. That is, the air sensitivity of GPS is tested and measured by performing the function of GPS and determining how well the functions of GPS are performed. Secondly, after debugging the GPS in the mobile terminal, whole annoying procedure of measuring method is performed again such as the user has to carry the mobile terminal having GPS functions and brings it outside for field test.

SUMMARY OF THE INVENTION

It is, therefore, an object of the present invention to provide a mobile terminal having a function to measure an air sensitivity of global positioning system GPS by obtaining a pulse density modulation value from an auto gain control AGC amplifier in the mobile terminal, without using additional equipment such as a diagnostic monitor.

It is another object of the present invention to provide a mobile terminal having a function to measure an air sensitivity of global positioning system GPS and displaying the measured air sensitivity on a display unit in the mobile terminal.

It is still another object of the present invention to provide a method for measuring air sensitivity of global positioning system GPS by predicting the air sensitivity of GPS according to the pulse density modulation values from an auto gain control AGC amplifier in the mobile terminal and displaying the measured air sensitivity of GPS on a display unit in the mobile terminal, without using additional equipment such as a diagnostic monitor.

In accordance with an aspect of the present invention, there is provided a method for measuring air sensitivity of global positioning system GPS, the method including the steps of: a) obtaining values of pulse density modulation PDM of auto gain control AGC amplifier in the mobile terminal within a predetermined time interval and storing the obtained values; b) analyzing the air sensitivity of the GPS by calculating a mean value of obtained values; c) displaying an analyzing result of step b) on a display unit of the mobile terminal as the air sensitivity of GPS.

In accordance with an aspect of the present invention, there is also provided a mobile terminal having a function to measure air sensitivity of global positioning system GPS, including: measurement mean for obtaining values of pulse density modulation PDM of auto gain control AGC amplifier in the mobile terminal within a predetermined time interval; storage means for storing the obtained values; analysis means for analyzing the air sensitivity of the GPS by calculating a mean value of obtained values; and display means for displaying the analyzing result of the analysis means as the air sensitivity of the GPS.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
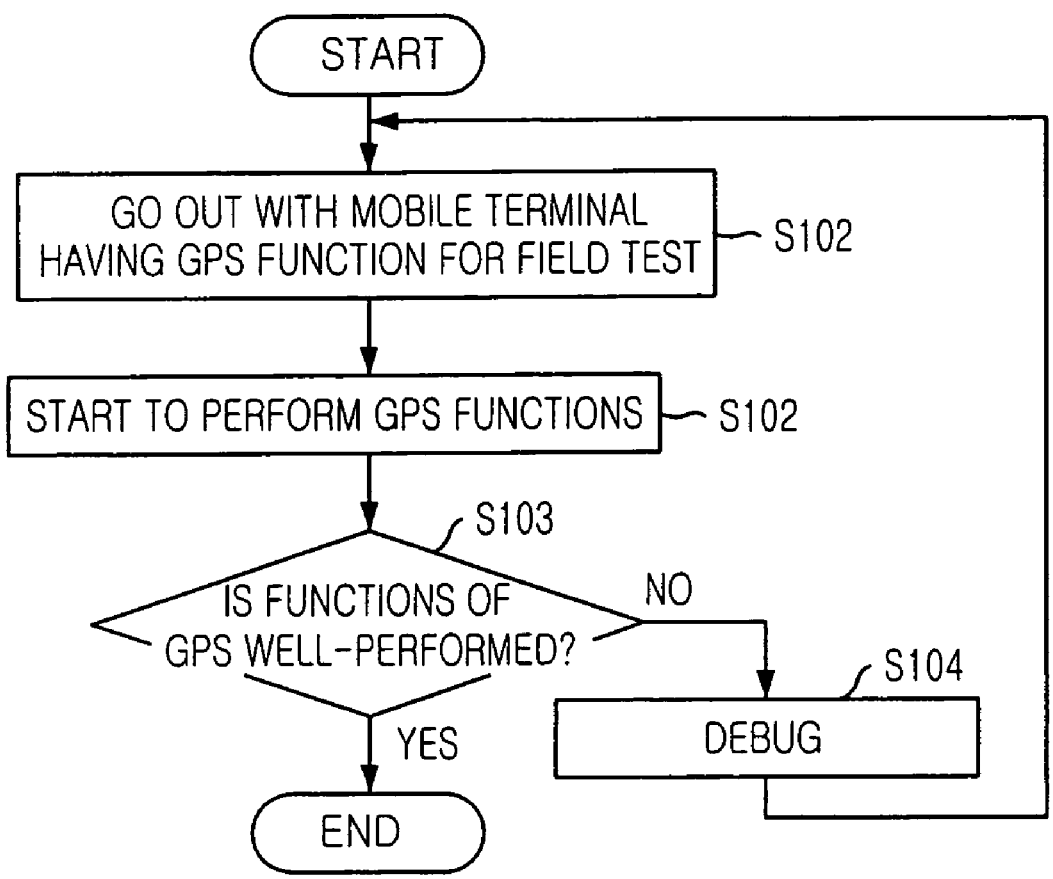
FIG. 1 is a flow chart showing a conventional method for measuring air sensitivity of global positioning system GPS.
Figure 2:
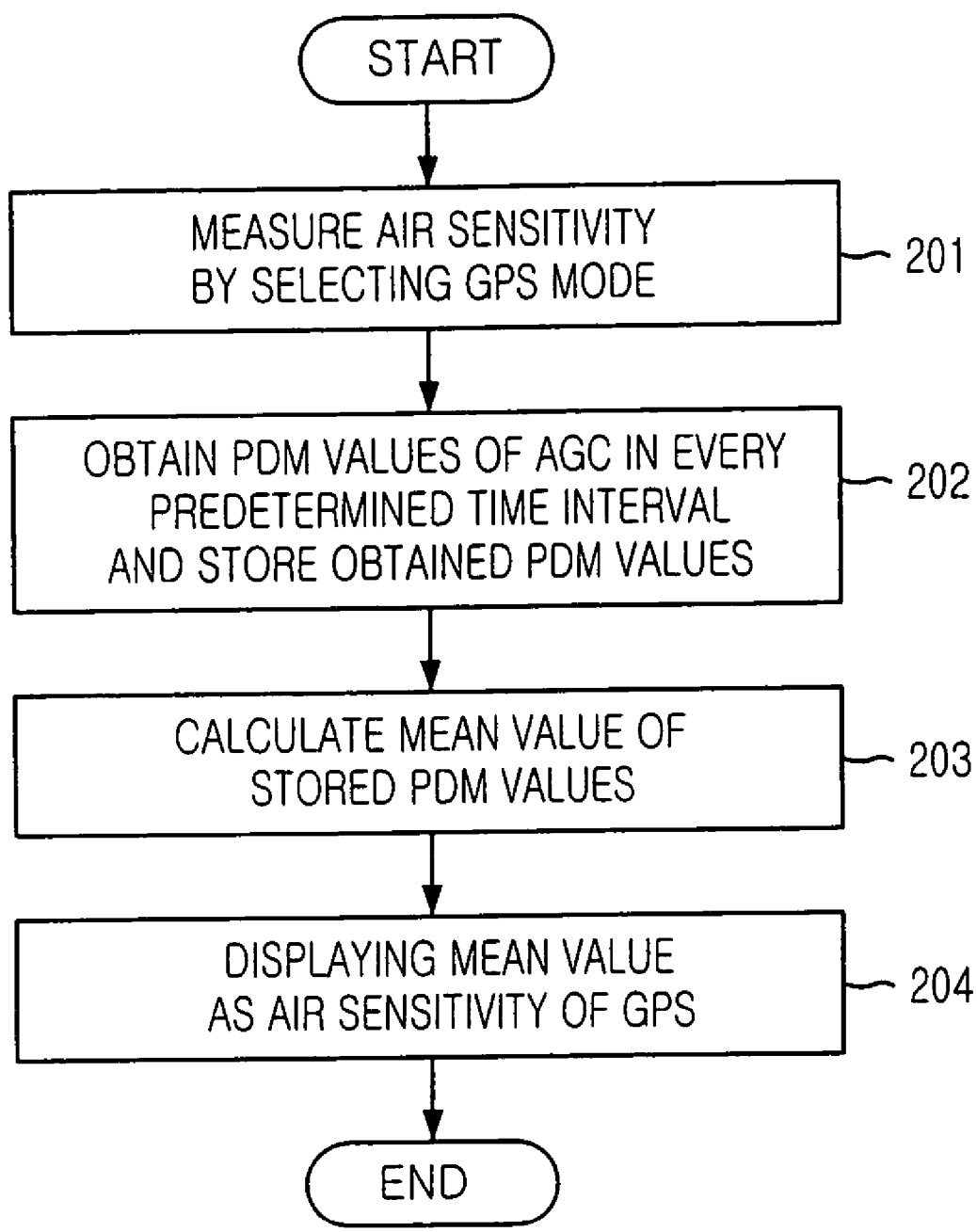
FIG. 2 is a flow chart of a method for measuring an air sensitivity of global positioning system GPS in a mobile terminal in accordance of a preferred embodiment of the present invention.

FIG. 2 is a flow chart of a method for measuring an air sensitivity of global positioning system GPS in a mobile terminal in accordance of a preferred embodiment of the present invention.

Referring to FIG. 2, a method for measuring air sensitivity of global positioning system in a mobile terminal is explained hereinafter.

At first, a user starts to operate a mobile terminal to measure air sensitivity by selecting a GPS mode at step S201. The mobile terminal obtains pulse density modulation PDM values of auto gain control AGC amplifier in the mobile terminal within a predetermined time interval and the obtained PDM values are stored at step S202. The PDM values are varied corresponding to strength of GPS signal and it is used for measuring air sensitivity of GPS in the present invention. After storing PDM values, a mean value of obtained PDM values is computed at step S203. After computing the mean value, the mean value is displayed on a display unit as the air sensitivity of GPS at step S204. The mean value can be displayed as a various form such as a number, a graph or a symbolic diagram.

Figure 3:
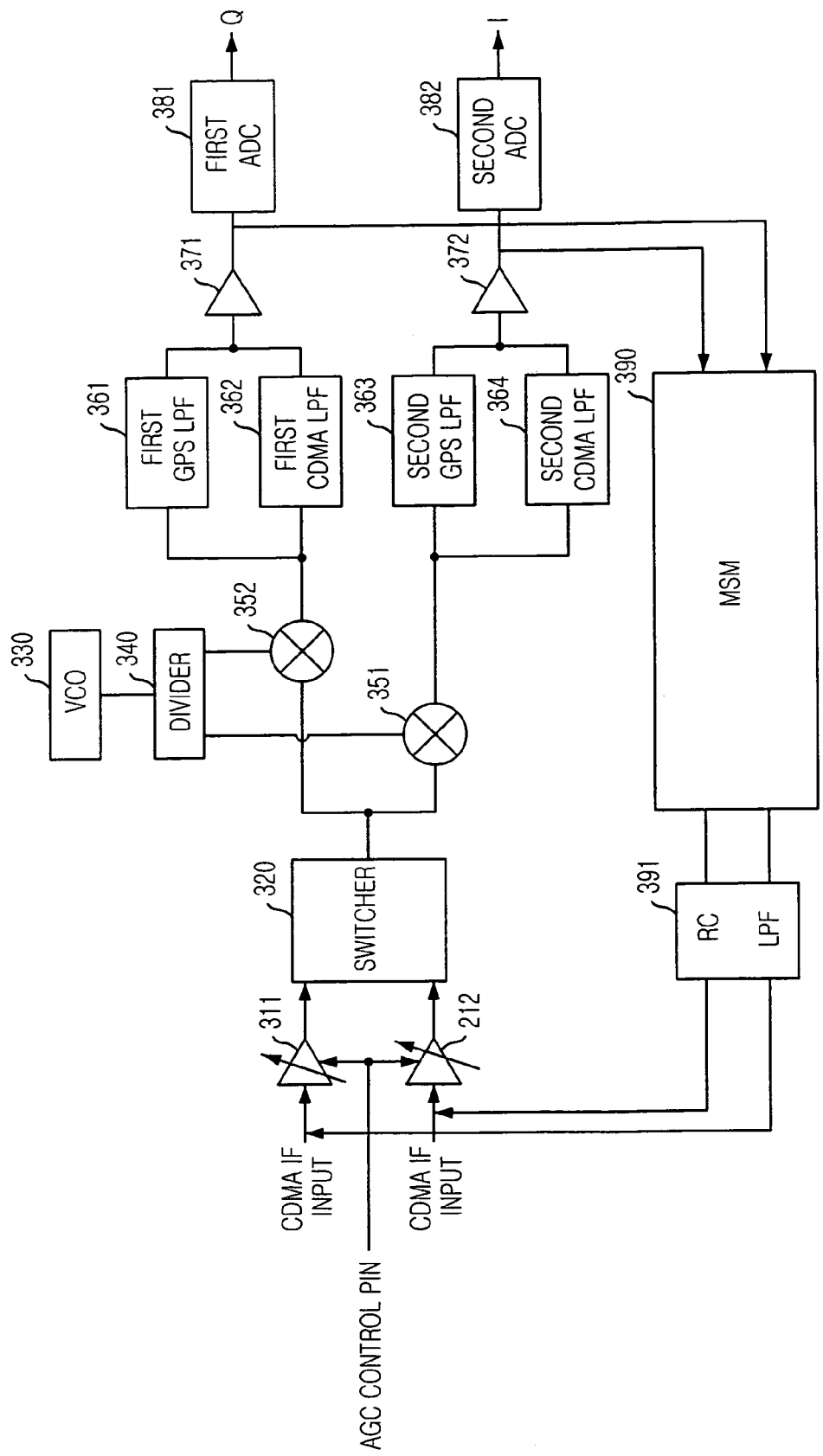
FIG. 3 is a circuit diagram for illustrating a circuitry of mobile terminal measuring air sensitivity of GPS in accordance with a preferred embodiment of the present invention.

FIG. 3 is a circuit diagram for illustrating a circuitry of mobile terminal measuring air sensitivity of GPS in accordance with a preferred embodiment of the present invention.

Referring to FIG. 3, the circuit includes a plurality of auto gain control AGC amplifier 311 and 312, a switch 320, a voltage control oscillator 330, a divider 340, a plurality of mixer 351 and 352, a plurality of low pass filers LPS 361 to 364, a plurality of amplifiers 371 and 372, a plurality of analog to digital converters ADC 381 and 382, a controller 390 (e.g., mobile station modem MSM available from Qualcomm Incorporated.) and a RC LPF 391.

A plurality of AGC amplifiers 311 and 312 receives input signal of CDMA IF or input signal of GPS IF, amplifies the input signal of CDMA IF or the input signal of GPS IF. It also dynamically controls its gains according to pulse density modulation PDM signal from the MSM 390.

Hereinafter, operations of the AGC amplifiers 311 and 312 are explained in detail.

The AGC amplifiers 311 and 312 control gain to maintain predetermined strength level of signals inputted to the ADC 381 and 382. That is, a mobile station modem MSM 390 measures strength level of input signals to the ADCs 381 and 382 before inputting to the ADCs 381 and 382 and obtains PDM values according to measured strength level of input signals. After obtaining the PDM value, it is transmitted to a RC LPF 391 for transforming to DC value. The DC value is feedback to AGC amplifiers 311 and 312 through the AGC control pine. Finally, the AGC amplifiers 311 and 312 receive the DC value and control gain to maintain predetermined strength level of input signals to the ADCs 381 and 382 based on the DC value. For example, if weak input signals are inputted to ADC 381 and 382, the AGC amplifiers controls to have high gain and if strong input signals are inputted to ADC 381 and 382, the AGC amplifiers control to have low gain to maintain predetermined strength level of input signals to the ADCs 381 and 382.

Therefore, according to the PDM signal from the MSM, gain of the AGC amplifiers 311 and 312 is varied and it is used as measuring the air sensitivity of GPS.

The switch 320 alternatively passes one of output signals of a plurality of AGC 311 and 312 according to CDMA mode or GPS mode.

The VCO 330 generates local frequency signal and outputs the local frequency signal to the divider 340.

The divider 340 divides the local frequency signal to a plurality of divided frequency signals and outputs a plurality of divided frequency signals to a plurality of mixers 351 and 352.

A plurality of mixers 351 and 352 generates a mixed signal by mixing output signals of the switch 320 and divided signals from the divider 340 and outputs the mixed signal to the plurality of LPF 361 to 364.

A plurality of LPF 361 to 364 receives the mixed signal from the mixers 351 and 352 and generates a filtered signal by filtering the mixed signal according to the CDMA mode or GPS mode.

A plurality of amplifiers 371 and 372 receives the filtered signal from the LPF 361 to 364 and generates amplified signals by amplifying the filtered signal. The amplified signals are outputted to a plurality of ADC 381 and 382.

A plurality of ADC 381 and 382 receives the amplified signal and coverts the amplified signal to In-phase signal and Quadrature-phase signal as a digital signal.

As mentioned above, the PDM values varied corresponding to strength of input signals to the ADC are stored in a memory(not shown) and its mean value is obtained by a process unit (not shown). The mean value is displayed for showing air sensitivity of GPS on the display unit of the mobile terminal.

The present invention can be used for determining a reference value of air sensitivity of GPS.

Figure 4:
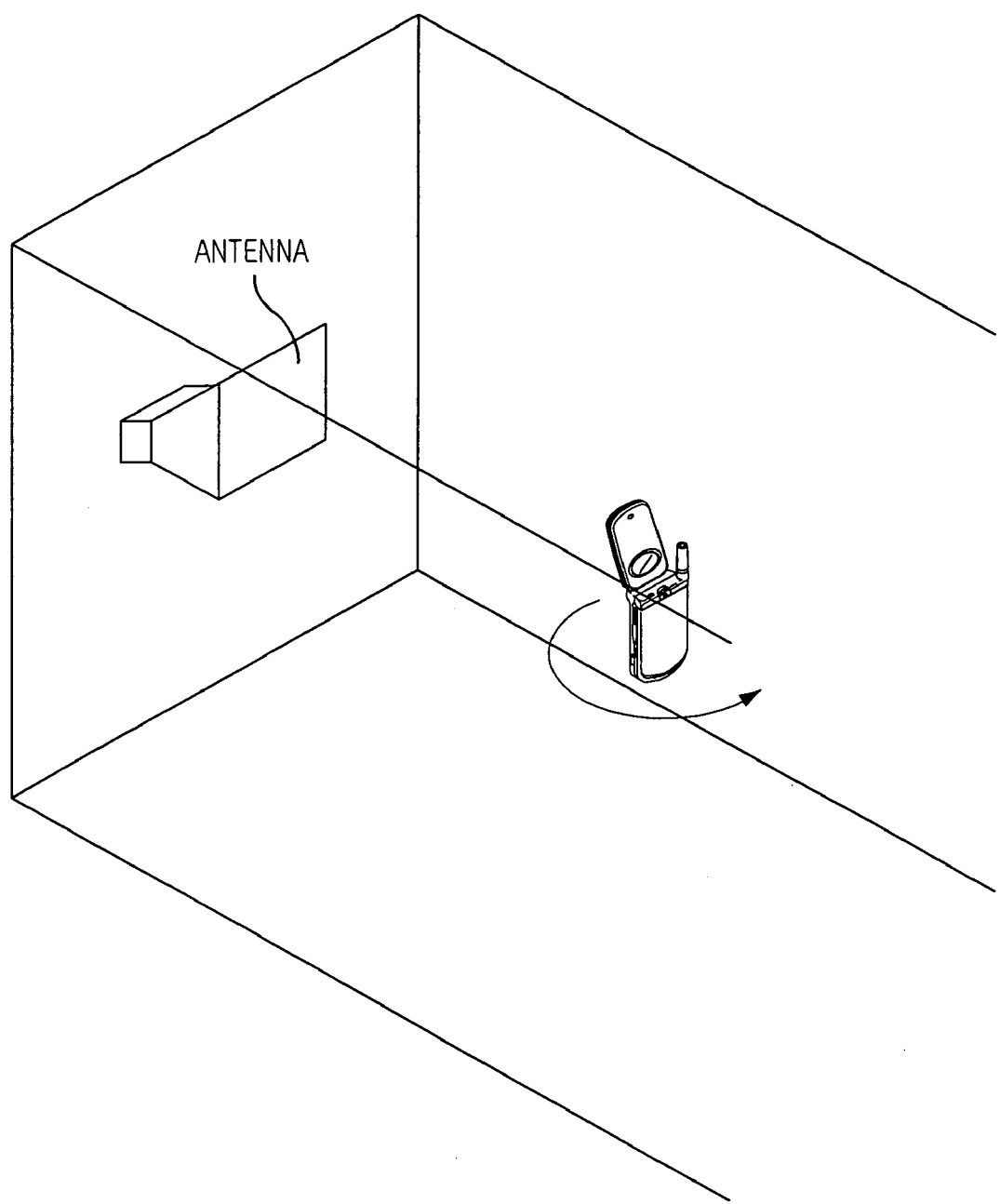
FIG. 4 is a perspective view showing a method for measuring reference air sensitivity of GPS in a radio anechoic chamber in accordance with a preferred embodiment of the present invention.

FIG. 4 is a perspective view showing a method for measuring air sensitivity of GPS in a radio anechoic chamber in order to determine air sensitivity reference of GPS in accordance with a preferred embodiment of the present invention.

Referring to FIG. 4, an antenna is installed to a global positioning system GPS signal generator for radiating GPS signal in the radio anechoic chamber. After installing the antenna, a mobile terminal 14 is posted around of the antenna. The mobile terminal 14 is automatically rotated to 15 degree in every a predetermined time period by using a motor (not shown). Every time the mobile terminal 14 is rotated in a predetermined degree, pulse density modulation PDM values are obtained and stored in the mobile terminal 14. The PDM values are varied according to strength of GPS signal. The PDM values are measured and stored in the mobile terminal until the mobile terminal is rotated to 360 degree. The PDM values of IF-baseband Chipset are stored and a mean value of the AGC PDM values is computed. The mean value is determined as a reference value and it can be used for analyzing the air sensitivity of the GPS in the mobile terminal in any occasions. Therefore, based on the air sensitivity reference measured in the radio anechoic chamber 10, the air sensitivity of the GPS can be accurately measured in any circumstances. Such a measured air sensitivity can be displayed through a LCD displayer in the mobile terminal.

Figure 5:
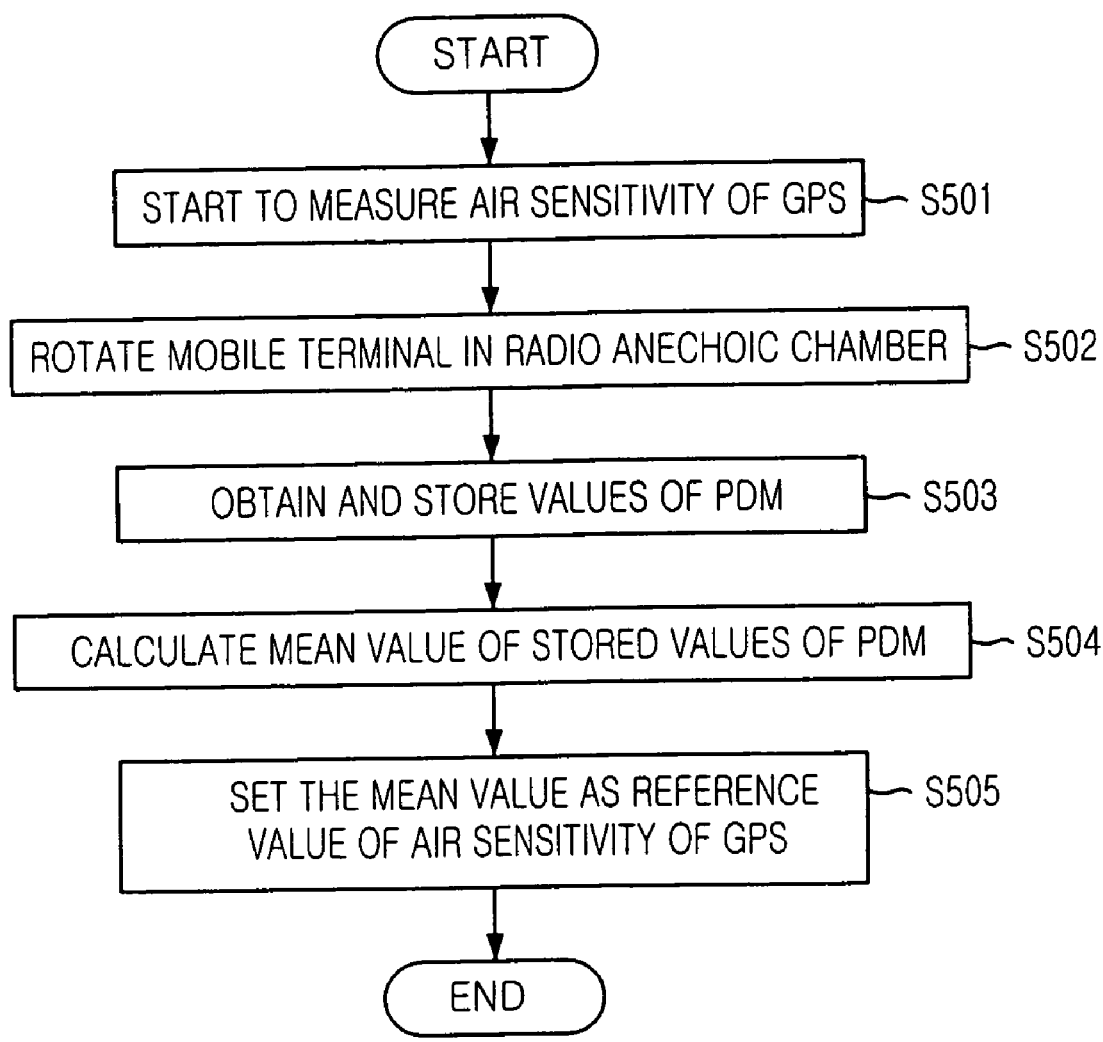
FIG. 5 is a flow chart showing a method for measuring air sensitivity of GPS in accordance with a preferred embodiment of the present invention.

FIG. 5 is a flow chart showing a method for measuring air sensitivity of GPS in order to determine air sensitivity reference of GPS in accordance with a preferred embodiment of the present invention.

Referring to FIG. 5, at first, a user starts to operate a mobile terminal to measure air sensitivity by selecting a GPS mode at step S501. The user puts the mobile terminal in a radio anechoic chamber, in which an antenna transmitting signal of base station is installed and rotates the mobile terminal in a predetermined angle at step S502. In the preferred embodiment of the present invention, the mobile terminal is rotated in 15 degree.

The mobile terminal obtains AGC PDM values which are varied corresponding to amplitude of GPS signal and the obtained AGC PDM values are stored at step S503.

After completing to rotate the mobile terminal to 360 degree, a mean value of obtained AGC PDM values is computed at step S504. After computing the mean value, the mean value is set as a reference value of air sensitivity of GPS at step S505.

As mentioned above, the present invention uses a pulse density modulation value of AGC amplifier in the mobile terminal to measuring air sensitivity of GPS. Therefore, the present invention can predict an air sensitivity of GPS without using additional diagnostic equipment such as a diagnostic monitor DM. Also, the measured air sensitivity of GPS can be displayed at a LCD displayer on the mobile terminal and therefore, the user can conveniently monitor the air sensitivity of the GPS.

While the present invention has been described with respect to certain preferred embodiments, it will be apparent to those skilled in the art that various changes and modifications may be made without departing from the scope of the invention as defined in the following claims.

What is claimed is:

1. A method for measuring an air sensitivity of a global positioning system (GPS) signal in a mobile terminal, the method comprising the steps of:
   obtaining a GPS signal value in the mobile terminal;
   analyzing the air sensitivity of the GPS signal value based on a reference GPS signal value stored in a memory of the mobile terminal; and
   displaying the air sensitivity of the GPS signal using the analyzed result on the display unit.

2. A method for measuring an air sensitivity of a global positioning system (GPS) signal in a mobile terminal, the method comprising the steps of:
   analyzing the air sensitivity of the GPS signal based on the GPS baseband signal in the mobile terminal; and
   displaying the air sensitivity of the GPS on a display unit of the mobile terminal by using the analyzed result.

3. A mobile terminal, comprising:
   a controller for obtaining a global positioning system (GPS) signal value;
   a display unit for displaying an air sensitivity of the GPS by using the GPS signal value; and
   a memory for storing a reference GPS signal value,
   wherein the controller analyzes the GPS signal value based on the reference GPS signal value, and the display unit displays the air sensitivity of the GPS using the analyzed result.

4. A mobile terminal, comprising:
   a controller for analyzing a global positioning system (GPS) baseband signal in the mobile terminal; and
   a display unit for displaying an air sensitivity of the GPS signal by using the analyzed result.

5. The method as recited in the claim 1, wherein the displayed air sensitivity is in the form of one of a number, a graph and a symbolic diagram.

6. The method as recited in the claim 2, wherein the displayed air sensitivity is in the form of one of a number, a graph and a symbolic diagram.

7. The mobile terminal as recited in the claim 3, wherein the displayed air sensitivity is in the form of one of a number, a graph and a symbolic diagram.

8. The mobile terminal as recited in the claim 4, wherein the displayed air sensitivity is in the form of one of a number, a graph and a symbolic diagram.

9. A method for displaying an air sensitivity of a global positioning system (GPS) signal in a mobile terminal, the method comprising the steps of:
   obtaining a GPS signal value in the mobile terminal;
   analyzing the air sensitivity of the GPS signal based on a reference GPS signal value stored in a memory of the mobile terminal; and
   displaying the air sensitivity of the GPS signal using the analyzed result on the display unit.

10. The method as recited in the claim 9, the displayed air sensitivity is in the form of one of a number, a graph and a symbolic diagram.

* * * * *